(12) United States Patent
Huntington et al.

(10) Patent No.: US 9,004,296 B2
(45) Date of Patent: Apr. 14, 2015

(54) DISPLAY APPARATUS

(76) Inventors: Justin Huntington, Rochedale South (AU); Randal Huntington, Balmoral (AU)

( * ) Notice: Subject to any disclaimer, the term of this patent is extended or adjusted under 35 U.S.C. 154(b) by 0 days.

(21) Appl. No.: 13/490,370

(22) Filed: Jun. 6, 2012

(65) Prior Publication Data

US 2012/0312763 A1    Dec. 13, 2012

(51) Int. Cl.
| | | |
|---|---|---|
| A47F 7/00 | (2006.01) | |
| A47F 7/04 | (2006.01) | |
| B62H 3/00 | (2006.01) | |
| A47F 5/00 | (2006.01) | |

(52) U.S. Cl.
CPC .. *A47F 7/04* (2013.01); *B62H 3/00* (2013.01); *A47F 5/0087* (2013.01)

(58) Field of Classification Search
CPC ........... A47F 7/04; A47F 5/0087; B62H 3/00; B62H 3/04; B62H 3/06; B62H 3/08; B62H 3/12; B62H 5/00; B62H 2003/005
USPC ............. 211/17–24, 168, 170, 171, 175, 197; 224/924; 248/121, 122.1
See application file for complete search history.

(56) References Cited

U.S. PATENT DOCUMENTS

| | | | | |
|---|---|---|---|---|
| 2,469,494 A | * | 5/1949 | Bushko ........................ | 211/172 |
| 2,899,080 A | * | 8/1959 | Merkouris ............... | 211/119.17 |
| 4,114,764 A | * | 9/1978 | Rich .............................. | 211/100 |
| 4,555,029 A | * | 11/1985 | Fiol .................................. | 211/22 |
| 5,474,189 A | * | 12/1995 | Peterson .......................... | 211/18 |
| 5,690,260 A | * | 11/1997 | Aikins et al. .................... | 224/505 |
| 6,082,552 A | * | 7/2000 | Pollock et al. .................. | 211/18 |
| 6,302,278 B1 | * | 10/2001 | Dueck ............................. | 211/17 |
| 6,626,340 B1 | * | 9/2003 | Burgess ........................ | 224/536 |
| 6,968,986 B1 | * | 11/2005 | Lloyd et al. ................... | 224/507 |
| 7,021,474 B2 | * | 4/2006 | Garcia Simon et al. ........ | 211/20 |
| 7,264,145 B2 | * | 9/2007 | Lloyd et al. ................... | 224/507 |
| 7,946,432 B1 | | 5/2011 | Swanson et al. | |
| 2003/0218106 A1 | * | 11/2003 | Pensel ........................... | 248/121 |
| 2009/0178984 A1 | * | 7/2009 | Ouyang .......................... | 211/18 |

FOREIGN PATENT DOCUMENTS

| | | |
|---|---|---|
| DE | 4438924 | 4/1997 |
| DE | 19805228 | 8/1999 |
| DE | 102010009123 | 8/2011 |
| EP | 0587240 | 3/1994 |
| WO | 2010/024020 | 3/2010 |

OTHER PUBLICATIONS

European Patent Office, "Extended European Search Report", EP Patent Application No. 12171323.4, issued Oct. 1, 2012.

* cited by examiner

*Primary Examiner* — Korie H Chan
(74) *Attorney, Agent, or Firm* — Fish & Tsang, LLP

(57) ABSTRACT

The present invention relates generally to a display apparatus. More specifically, the invention relates to an apparatus that displays large items, such as bicycles, safely and in a manner that enhances sales experience. The present invention also relates to associated kits and packages.

19 Claims, 21 Drawing Sheets

FIGURE 2
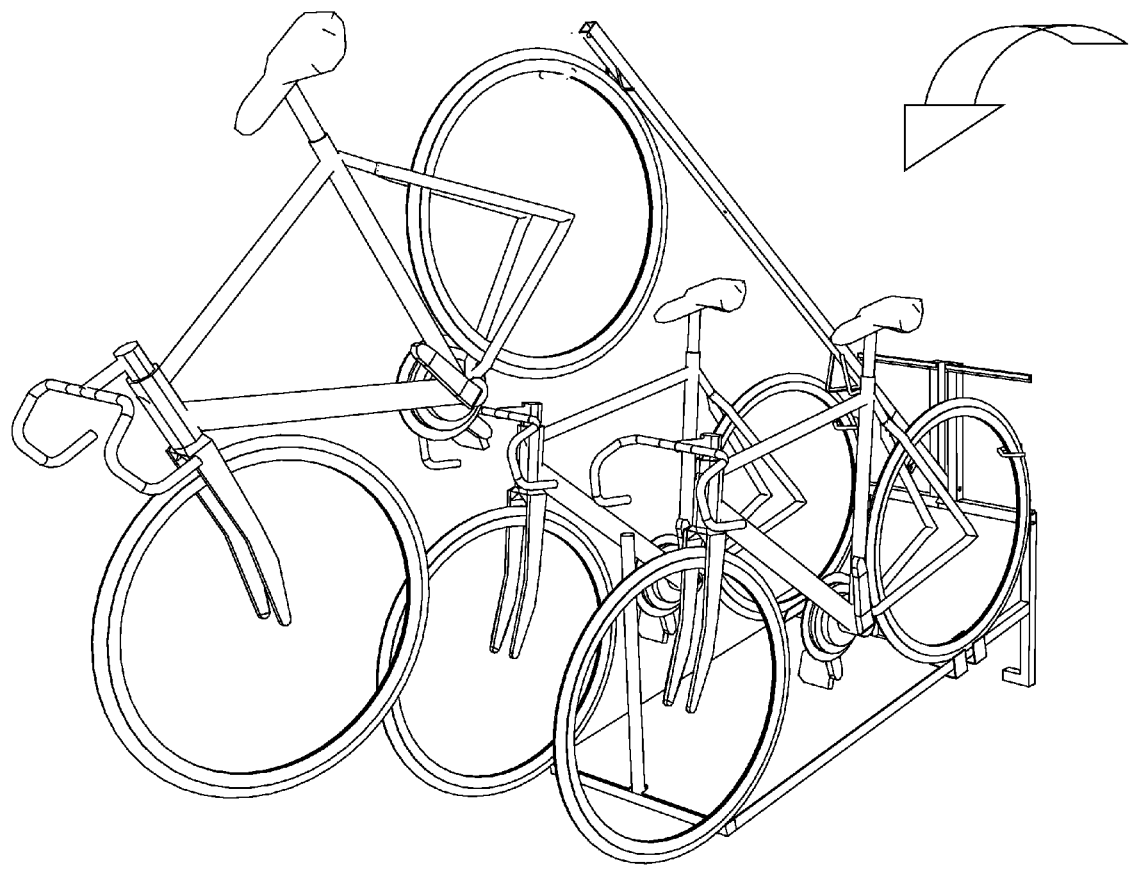
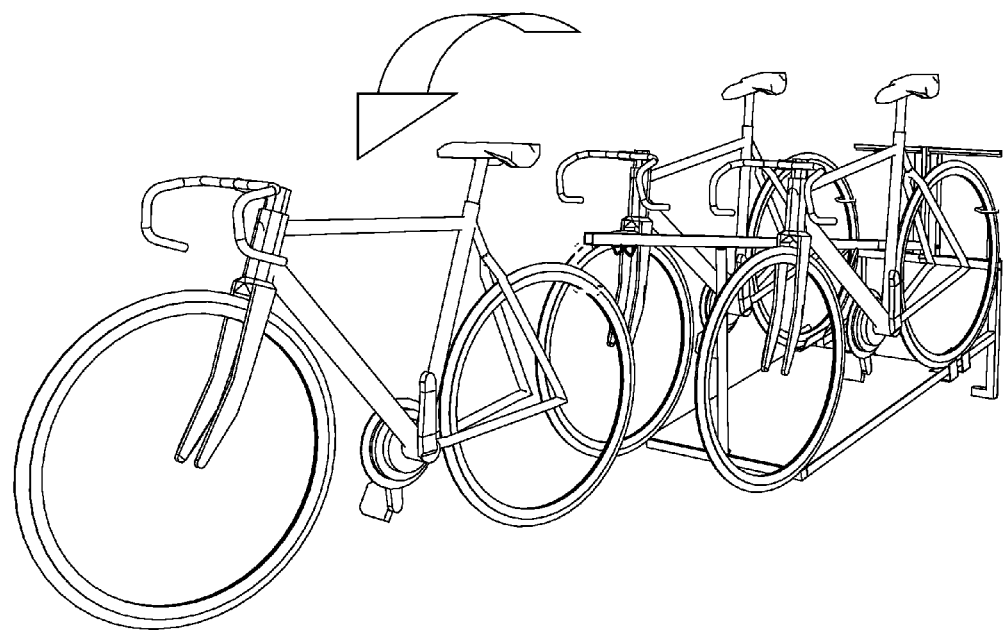

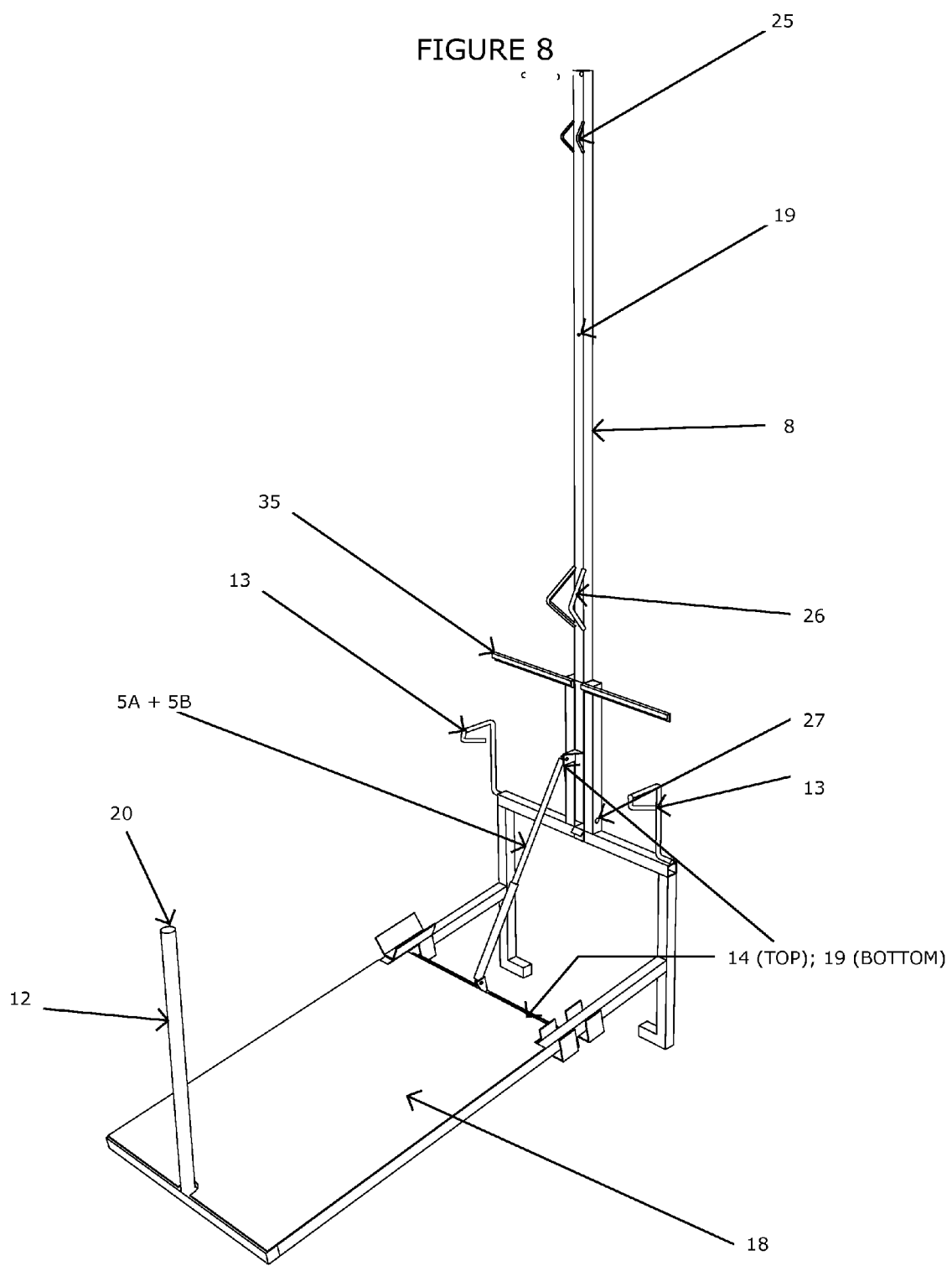

DISPLAY APPARATUS

This application claims the benefit of priority to Australian provisional application having application no. 2011902242, titled "Display Apparatus", and filed on Jun. 7, 2011. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The present invention relates generally to a display apparatus. More specifically, the invention relates to a rack that displays large items, such as bicycles, safely and in a manner that enhances sales experience. The present invention also relates to associated kits and packages.

CROSS-REFERENCE TO RELATED APPLICATIONS

Not applicable.

STATEMENT REGARDING FEDERALLY FUNDED RESEARCH

Not applicable.

BACKGROUND TO THE INVENTION

In many retail outlets and businesses, medium to large items are being sold. The displaying of medium to large items can present problems that are not encountered when selling smaller items. For example, adequate floor space is necessary for providing an acceptable display of a medium to large item for sale. Medium to large items which are displayed on the floor has disadvantages such as (1) reduces the amount of floor space available for the customers to freely move around the store, (2) reduces accessibility of the items (e.g. one item which is of interest to a customer may be behind another item so it is necessary to remove the first encountered item), (3) reduces the amount of stock that can be displayed in the store, (4) makes it difficult to display the items in an attractive manner thus reducing the sales experience and (5) creates an unsafe customer environment (e.g. tripping over the items) and (6) creates an unsafe employee environment such as when a sales clerk is required to lift the item (either from the floor or from a hook, bracket for example) thus increasing the risk of injury such as back injury. Items, such as bicycles and canoes, can also be mounted on walls via brackets or hooks. But, here again, there is a health and safety issue with a sales clerk lifting these large (and sometimes heavy) items off the walls for the customer to view more closely thus improving sales experience.

Providing floor space in a retail outlet for bicycles is equally or perhaps more difficult. A first problem which may be caused by bicycles in the outlet is that there is generally a large number of bicycles on display since there are many different models, sizes and types of bicycles available. Also bicycles can be hard to display because bicycles need a stand in order to be in an upright or acceptable displaying position. Putting bicycles on shelves can be proved to be very difficult and unsafe because of the above reasons which provide bicycles with instability.

There is a need to create a display mechanism which improves sales experience but yet does not jeopardise safe customer and employee environment and maintains efficient use of floor space. The ability to improve sales experience is a key factor in achieving adequate sales and proper turnover of stock. The display apparatus as described and defined herein meets the long felt need of displaying items in a safe environment but yet efficiently utilises floor space and improves sales experience. The invention directed to the display apparatus makes a substantial contribution to the working of the apparatus as defined herein. Although a bicycle is an example of an item that can be displayed by the apparatus, any item for displaying is contemplated herein and is within the scope and spirit of the invention.

SUMMARY OF THE INVENTION

According to the present invention there is provided a display apparatus comprising a frame and a display arm having a mounting portion at one end for mounting an item for displaying wherein the display arm is pivotally mounted at its other end to the frame for movement between a raised position and a lowered position wherein the display arm is biased towards the raised position.

In one embodiment, the frame is free-standing.

In another embodiment, the mounting portion may be a hook, clip, bracket, clamp, clasp, ring, strap, fastener or the like or any combination thereof. The hook may be a wheel hook and the item may be a bicycle. The hook may be in the shape of hook 35. The mounting portion may contain one or more members for receiving and stabilizing one or more parts of the display item when the display arm is in a fully raised position. The one or more members may receive and stabilize one or more bicycle wheels.

In another embodiment, the frame comprises a portion for retaining the display arm at a lowered position. The portion may retain the display arm by magnetic means or mechanical means. The portion may comprise one or more magnets. The one or more magnets may be affixed on top or near the top of the portion. A further one or more magnets may be affixed to the display arm such that the one or more magnets on the portion retaining the display arm is aligned with and thus able to contact the one or more magnets on the display arm. In a further embodiment, the mechanical means may comprise use of a hook, clip, bracket, clamp, clasp, ring, fastener, strap or the like or any combination thereof to retain the display arm in a lowering position.

In a further embodiment, there are means to stabilise the item when the display arm is in a fully lowered positioned. Means for stabilising an item such as a bicycle may comprise a wheel stand.

In one embodiment, a fully raised position is a substantially vertical position compared to the floor. In another embodiment, a fully lowered position is a substantially horizontal position compared to the floor. When the display arm is in the fully lowered position, the display item is also substantially horizontal compared to the floor.

In one embodiment, the arm is biased towards a raised position by a shaft and piston arrangement. In a non-limiting example, the display arm may be biased by a shaft and piston arrangement wherein the shaft is arranged to force the piston outwards or inwards.

The movement of the display arm forces the piston outwards or inwards. In a further embodiment, the piston moves along a length of a channel within the shaft, wherein each end of the shaft and piston arrangement is coupled to a guide which guides movement of the piston in and out of the shaft.

One of the guides may be affixed to the frame whilst the other guide may be affixed to the display arm. In a further embodiment, the shaft and piston arrangement may be in the form of a gas strut. In yet a further embodiment, the gas strut may be a pneumatic strut. The strut may be a hydropneumatic strut. In a preferred embodiment, the shaft and piston arrangement is a gas strut. The strut may comprise one or more counterbalances and one or more springs, rubber disks, rubber bands, cords, torsion bars, granular spheres, magnets or the like or any combination thereof.

In an embodiment, the display arm pivots at a pivot point. In another embodiment, the apparatus comprises two or more display arms.

In a further embodiment, the apparatus may display additional items. One or more items, such as bicycles, may be displayed. The bicycles may be displayed by sitting the bicycles on a panel that is affixed to the frame. In another embodiment, the additional bicycles may be stabilised by the apparatus. The additional display items such as bicycles may contact one or more points on the frame. For example, when the display item is a bicycle, the wheels of the bicycle are able to contact one or more points on the frame. The frame may contain one or more members for receiving the bicycle wheels. The members may be in the general shape of a saddle. The members may be brackets.

A panel may be interchangeable with other panels. The dimensions of a panel can vary to allow for additional or fewer items to be displayed on the panel of the apparatus.

Accordingly the apparatus is for displaying at least one item such that the item is mounted on the display arm. The item is any display item. In a non-limiting example, the display item may be a bicycle or a canoe. However, other items such as recreational items, lawn care machinery and auto accessories and parts may be mounted on the apparatus as display items. In one embodiment, a recreational item may be a canoe, a kayak, a small boat, a jet ski, an outboard motor or a trolling motor. An example of gardening and lawn care machinery that may be displayed by the apparatus may include lawn mowers, weed trimmers and blowers. In a further example, auto accessories and parts such as hubcaps, rims, tyres, and engine blocks may be displayed by the apparatus.

In a further embodiment, the present invention relates to a package or kit comprising the apparatus as described herein whereby the apparatus comprises one or more parts for assembly comprising instructions for assembling the apparatus.

An advantage of the present invention is the displaying of one or more items which can be raised and lowered providing accessibility to the one or more items on display which thereby provides a safe customer and employee environment along with maximizing floor space within the outlet or business. The invention will now be described as per the figures below which are examples of the display apparatus and should not be construed in any way as limiting the scope of the invention.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1 shows two additional bicycles on display.

FIG. 2 is a view of an apparatus encompassed by the present invention. The figure contains an upper left schematic diagram and a lower right schematic diagram. The display arm of the apparatus is in a partially lowered position in the upper left schematic. In the lower right schematic, the arm is in a fully lowered position.

FIG. 8 is a side, upper view of an apparatus encompassed by the present invention with panel 18 and with arm 8 in the fully raised position.

FIG. 9A is a side, upper view of an apparatus encompassed by the present invention with panel 18 and with arm 8 in the fully raised position. The dotted outline highlights panel 18 which is exemplified in more detail in FIGS. 9B and 9C. FIG. 9B schematically shows an example of a panel only. FIG. 9C depicts one corner of the panel.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 9A:
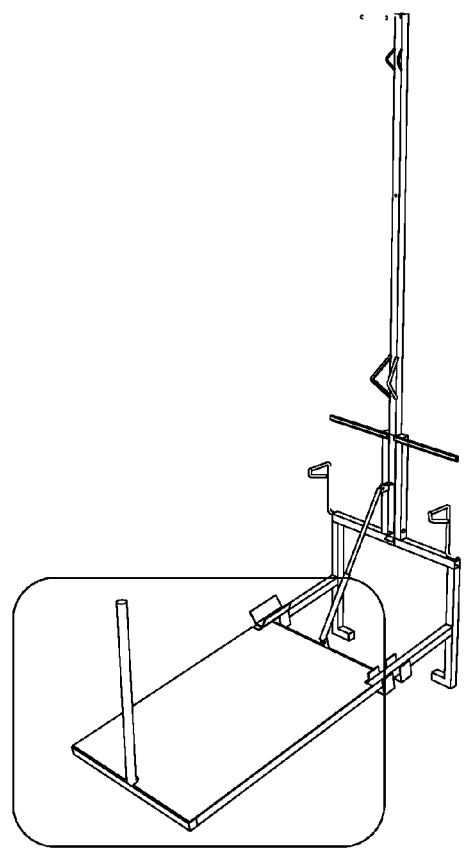
FIGS. 9A, 9B and 9C.

Referring to the accompanying figures, there is illustrated a display apparatus, as generally shown in 1, having a frame 2 and a display arm 8 having a mounting portion 4 wherein arm 8 is pivotally mounted at pivot point 3 for movement between a raised position as shown in FIGS. 1, 3A, 3B, 4-9A and 13A and a lowered position as shown in the lower left schematic diagram of FIG. 2. A display apparatus as shown in 1A is the same apparatus as in 1 but without panel 18, which allows the reader to see the members that make up frame 2 which are hidden by panel 18 in 1. The apparatus may include a cross bar as represented in FIGS. 8, 9A and 10 as non-limiting examples. The apparatus may include additional members. The additional members may provide further support for the structure of the apparatus or support of the display item(s).

Figure 13A:
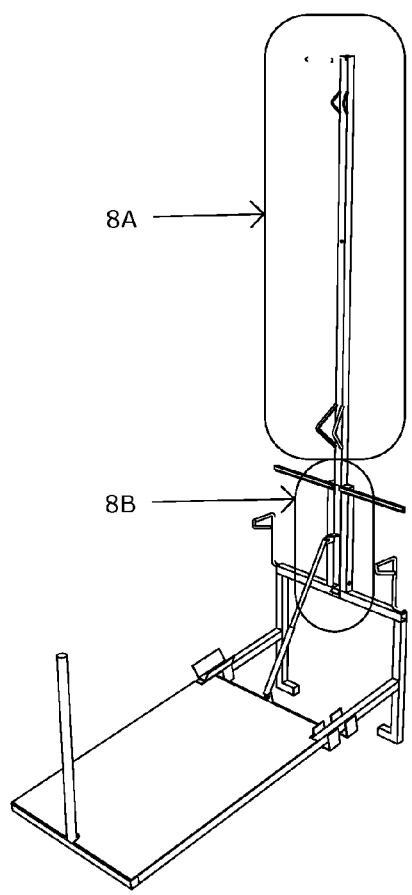
FIG. 13A is a side, upper view of an apparatus encompassed by the present invention with panel 18 and with arm 8 in the fully raised position. Arm 8 is depicted through use of the dotted outlines in this figure as two separate parts comprising a long piece, as represented by member 8A and a short piece, as represented as member 8B in the figure.
Figure 13B:
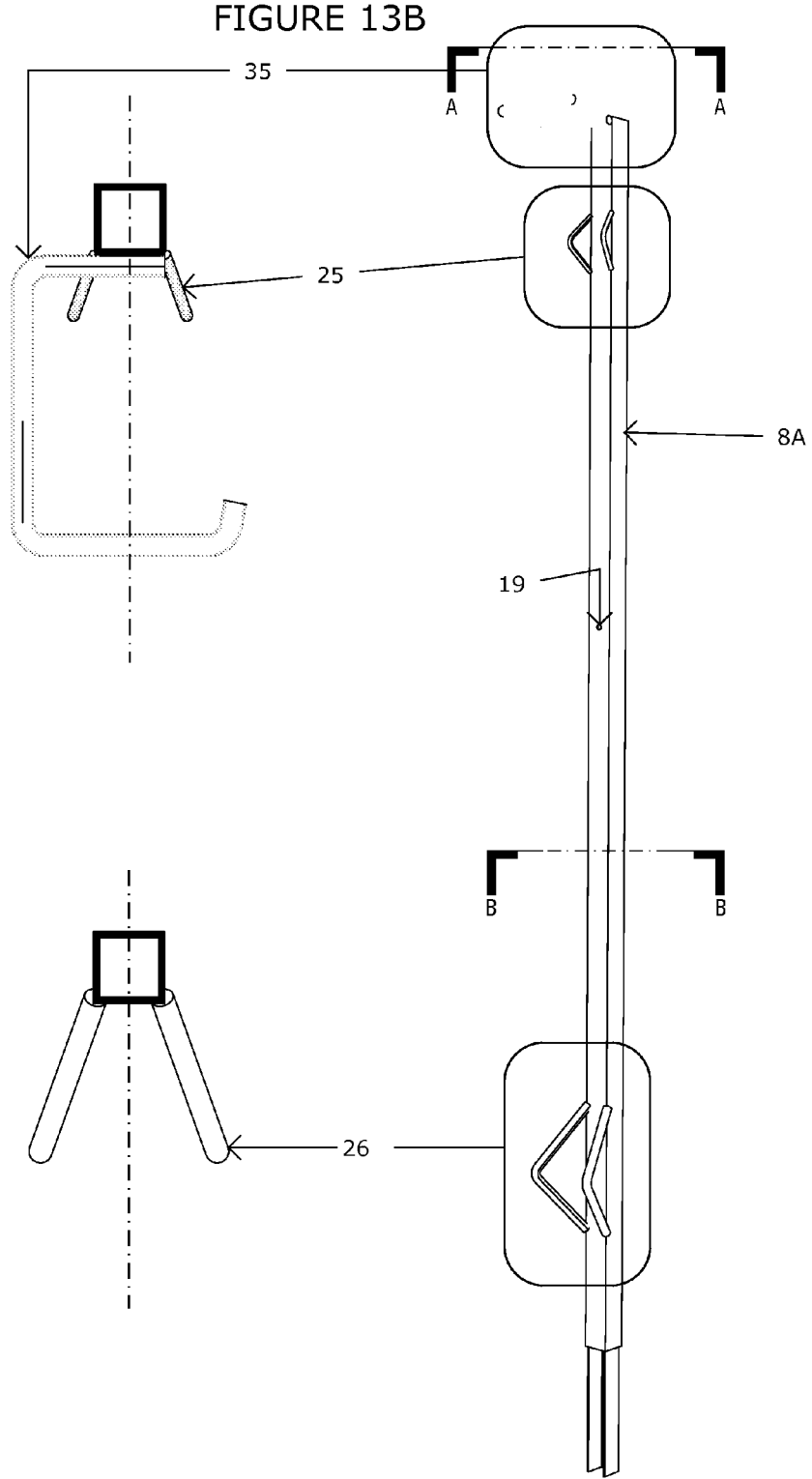
FIG. 13B is a detailed depiction of member 8A including dimensions. Members 18, 25, 26 and hook 35 are exemplified in this figure.

The item for displaying is mounted on mounting portion 4. Any means for mounting the item on mounting portion 4 is contemplated herein and includes a hook, clip, bracket, clamp, clasp, ring, strap or the like or any combination thereof. The item may be a bicycle and mounting portion 4 may be a wheel hook in the general shape of hook 35 as represented in FIG. 13B.

Figure 11:
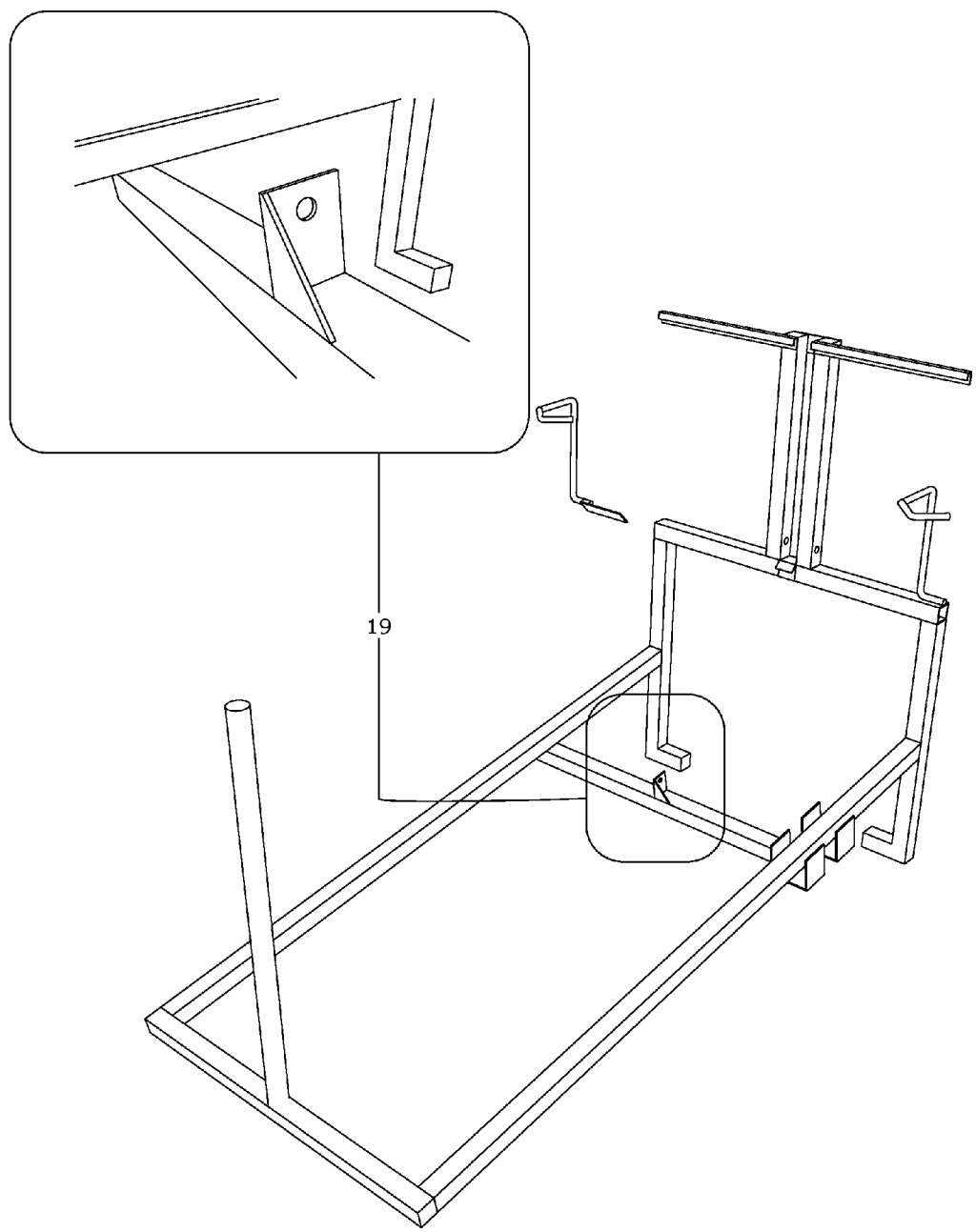
FIG. 11 represents a non-limiting example of guidance 19 as positioned on apparatus.
Figure 12:
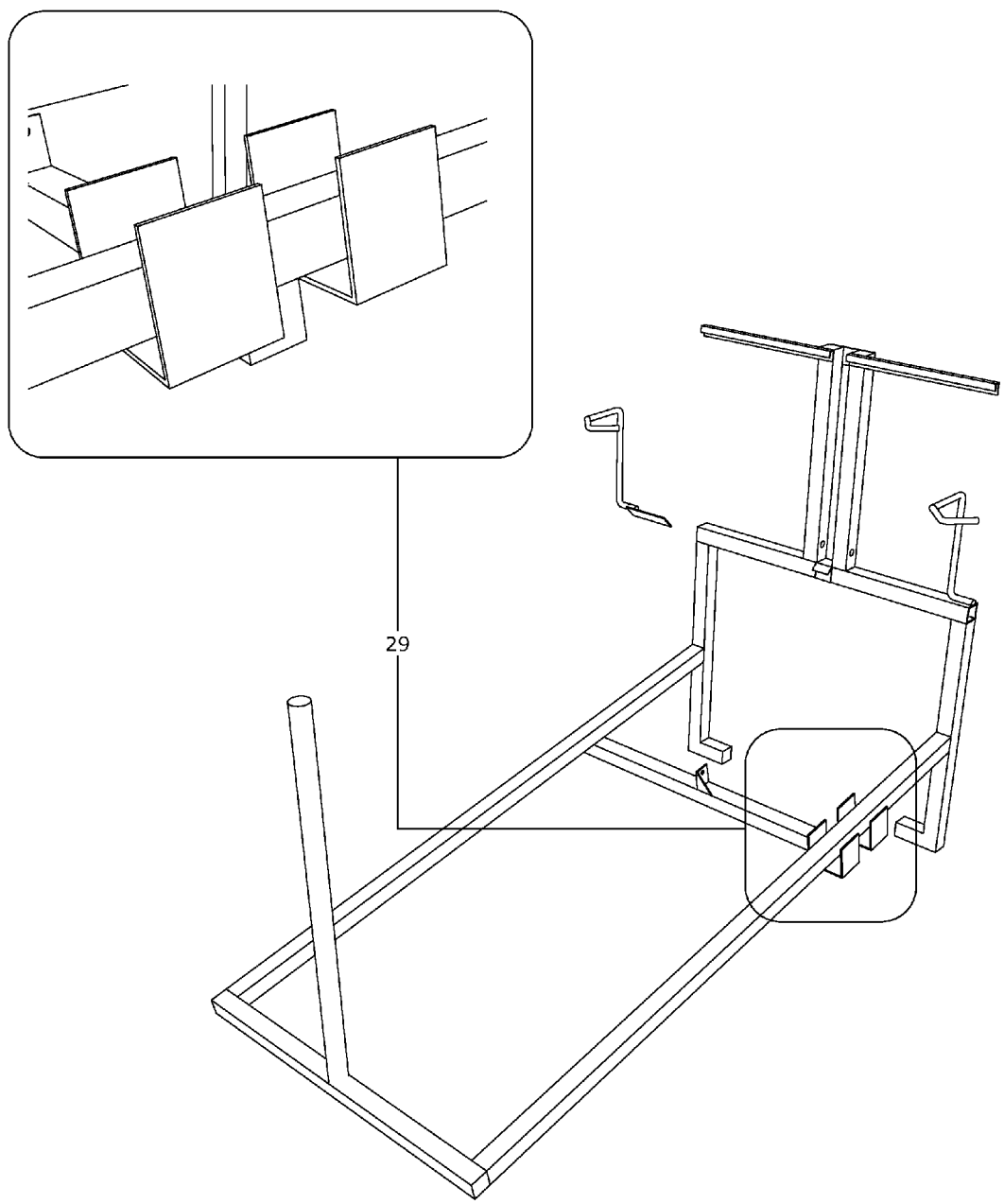
FIG. 12 represents a non-limiting example of members 29 which are affixed on the frame of the apparatus and contact and stabilize display items when the display items are substantially horizontal to the floor. Members 29 also function to link two or more apparatus together.
Figure 13C:
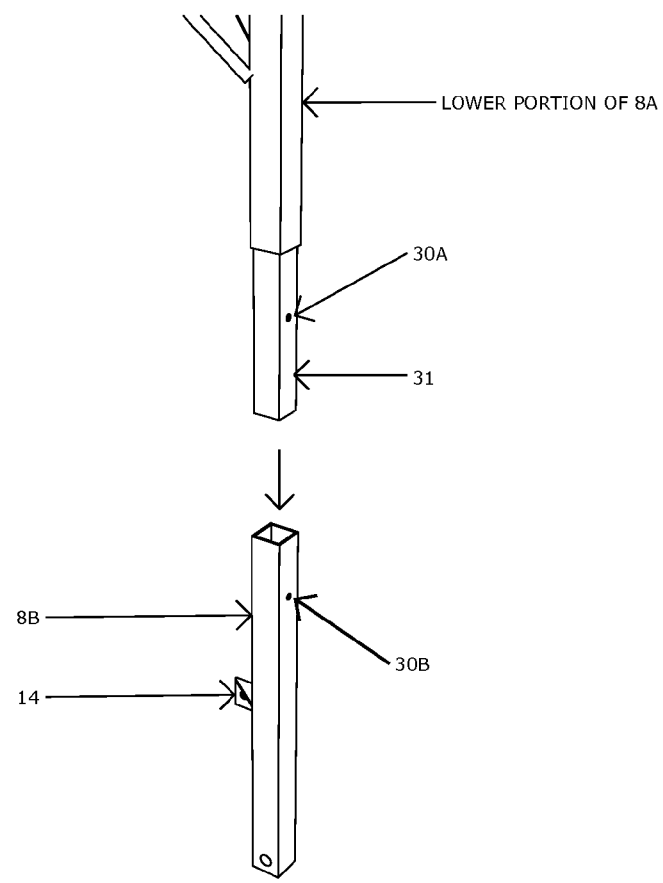
FIG. 13C is a diagram that provides an example of how member 8B may fit into the lower portion of 8A including fixing means 30A and 30B.
Figure 13D:
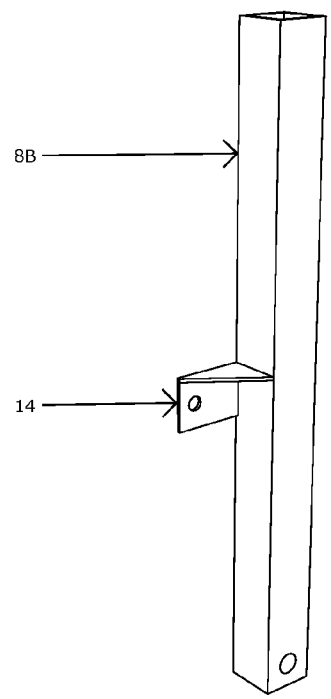
FIG. 13D is a detailed depiction of a non-limiting example of guide 14 as affixed to 8B.

Display arm 8 is biased towards the raised position. In a non-limiting example, display arm 8 may be biased by a shaft 5A and piston 5B arrangement (together 5C) wherein shaft 5A is arranged to force piston 5B outwards or inwards. In a further embodiment, shaft 5A is arranged to force piston 5B outwards or inwards wherein movement of piston 5B is along a length of a channel within shaft 5A, wherein each end of the shaft 5A and piston 5B arrangement (5C) are coupled to guide 19 and guide 14 (which guides movement of the piston in and out of the shaft) and ensures that the shaft 5A and piston 5B arrangement are connected to frame 2 and arm 8. Guide 14 is affixed to display arm 8. A non-limiting example of guide 14 is represented in FIGS. 13C and 13D which shows how guide 14 could be connected to member 8A but any means to which guide 14 can be connected to arm 8 is contemplated herein. Guide 19 is described below and a non-limiting example of guide 19 is represented in FIG. 11. As examples, guides 14 and 19 each comprise 2.5 mm thick plates with 8 mm diameter holes, respectively, but any design which allows the working of the shaft and piston arrangement is within the scope of the invention and therefore contemplated herein. A detailed example of guide 14 can be found in FIG. 13D.

In one example, the shaft 5A and piston 5B arrangement may be in the form of a gas strut in which the gas strut may be a pneumatic strut. Alternatively, the shaft 5A and piston 5B arrangement may be in the form of a hydropneumatic strut. In a preferred example, the shaft and piston arrangement is a gas strut as per the accompanying figures. One or more counterbalances may be used to assist in the movement of the item and display arm 8 between the raised and lower positions. The strut may comprise one or more springs, one or more rubber disks, one or more rubber bands, one or more cords, one or more torsion bars, one or more granular spheres, one or more magnets and/or any combination thereof.

The apparatus provides a user, such as a sales clerk, with a mechanism for retrieving a bicycle from the raised position in which the bicycle is being displayed to a lower position so that a customer can transition from a purely visual encounter initially with the bicycle to a subsequent tactile experience. This transition would likely enhance sales experience by the customer and the sales clerk and may result in an increase in the percentage of sales per customer visits in comparison to bicycles that are displayed by other apparatuses that make up the prior art. Specifically, display arm 8 moves to the lower position through the use of biasing and pivoting as described above. Display arm 8 pivots at pivot point 3 to achieve movement between a raised position as shown in FIGS. 1, 3A, 3B, 4-9A and 13A and a lowered position as shown in the lower left schematic diagram of FIG. 2.

In one example, the raised position is in a substantially vertical position compared to floor 20. In another example, the lowered position is in a substantially horizontal position compared to floor 20.

In a lower position, display arm 8 may contact or be in proximity with retaining portion 6. Retaining portion 6 may be affixed to member 12. Retaining portion 6 has the means to retain display arm 8 in a lower position. In a non-limiting example, retaining portion 6 may retain display arm 8 in a lowering position through magnetic means or mechanical means. Retaining portion 6 may be or comprise one or more magnets. In a non-limiting example, the one or more magnets may be affixed to a top part of portion 6 as represented by magnet 20 in FIG. 8. The one or more magnets may come into contact with one or more magnets affixed to 19 as represented in FIG. 13B. In a non-limiting example, mechanical means may include use of hook, clip, bracket, clamp, clasp, ring, fastener or strap or the like or any combination thereof to retain display arm 8 in a lowering position.

To further describe the relationship between the shaft 5A and piston 5B arrangement and frame 2, it is contemplated herein that guide 19 is affixed to cross-bar member 10 at a position which is about halfway along the entire length of cross-bar member 10. One end of cross-bar member 10 is transaxially affixed to a first member 16 whilst the other end of cross-bar member 10 is transaxially affixed to a second member 16. The first member 16 and second member 16 are substantially parallel to each other. One end of the first member 16 is transaxially affixed to one end of member 11 whilst one end of the second member 16 is transaxially affixed to the other end of member 11. First member 16 and second member 16 are substantially perpendicular to member 11 in at least one plane of axis. Member 11 may be substantially horizontal to floor 20.

One end of member 12 is transaxially affixed to member 11 at a position which is about halfway along the entire length of member 11. Member 12 is substantially vertical and may comprise wheel stand 7 and retaining portion 6. Retaining portion 6, which is affixed to the other end of member 12, has the means to retain display arm 8 in a lower position. In a non-limiting example, member 12 comprises wheel stand 7 to stabilize a bicycle. As contemplated herein, other arrangements may be designed and used as opposed to wheel stand 7 to display items. One skilled in the art would understand from the description and figures how to design an arrangement that would suit the item displayed and that the choice of arrangement would be governed by the characteristics of the display item, such as shape of the item at the front of the item coming toward the customer and overall length of the item. The person skilled in the art would also understand that the apparatus should not be limited to wheel stand 7 and that any arrangement or mechanism that stabilises a display item when arm 8 is in a fully lowered position is contemplated herein and within the scope and spirit of the invention.

Arm 8 may comprise two members which are assembled together for the working of the arm. In non-limiting examples, FIGS. 13A and 13D provide illustrations of these two members which are labelled 8A and 8B. The inventors provide examples of how these members connect to form arm 8. As represented in FIG. 13C in the form of a non-limiting example, 8A and 8B are connected via 30A and 30B. In FIG. 13B, member 8A is shown in detail as having members 25 and 26 to assist in stabilization of the display item. Also, member 8A is shown to comprise hook 35 but any means in which the display item is held by mounting portion 4 of arm 8 is contemplated herein. Members 25 and 26 are shown as wheel stands as non-limiting examples. Any means that stabilizes the display item when arm 8 is in a substantially vertical position is contemplated herein.

To further describe the relationship between arm 8 and frame 2, there is contemplated herein member 15 which is adjacent to display arm 8 whereby one end of member 15 is transaxially affixed to member 17 whilst the other end is free. Member 15 is substantially parallel to arm 8 when arm 8 is in a fully raised position. There may be a second member 15. The first member 15, second member 15, and arm 8 may be juxtaposed to one another whereby arm 8 is between the first member 15 and the second member 15. The first member 15 and the second member 15 may be in a substantially perpendicular position to arm 8 when arm 8 is in a fully lowered position.

As contemplated herein, the first member 15, second member 15 and arm 8 are transaxially affixed to member 17 at approximately halfway along the entire length of member 17. In FIG. 13D, an example of a lower portion of 8B of arm 8 indicates a hole that may receive a bolt for affixing arm 8 to members 15. Other details of how arm 8 is affixed to members 15 and their relationship to member 17 are represented in FIG. 10. Any means for affixing arm 8 to members 15 is contemplated herein. FIG. 10 also describes member 13 and member 36. A non-limiting example of member 36 is to retain the shape of the panel when it is flexed.

Further, one end of member 17 is transaxially affixed to one end of a first member 9 whilst the other end of member 17 is transaxially affixed to one end of a second member 9. The other end of the first member 9 is transaxially affixed to one end of member 21 whilst and the other end of the second member 9 is transaxially affixed to the other end of member 21. In another non-limiting example, member 17 and member 21 are substantially perpendicular to member 9 in at least in one plane of axis. In a further example, member 17 may be substantially horizontal and vertically supported by member 9. In turn, member 21 may horizontally support the first and second member 9. Members 17 and 21 may be substantially parallel to each other.

The process of affixing may be through fastening, bolting or welding. Such fastening or bolting may involve use of bolts, nuts, screws, rivets, clasps, clamps, welding and welding equipment, rings, adhesives, fasteners or the like or any combination thereof.

In FIGS. 5 to 7, 9B, 9C, 10 to 12, 13B, 13D, 14 and 15, the inventors have provided measurements, dimensions and specific designs of the apparatus. This degree of detail is only to provide one skilled in the art examples of the apparatus to thus enable the skilled person to work the invention. The detail described herein should not be construed in any way as narrowing the scope of the invention. Any length or size of the various members or parts that make up the apparatus which enables one skilled in the art to work the invention is contemplated herein. It is possible that a person skilled in the art may wish to scale up the apparatus (and strengthen the biasing) to handle larger, heavier display items.

Figure 14:
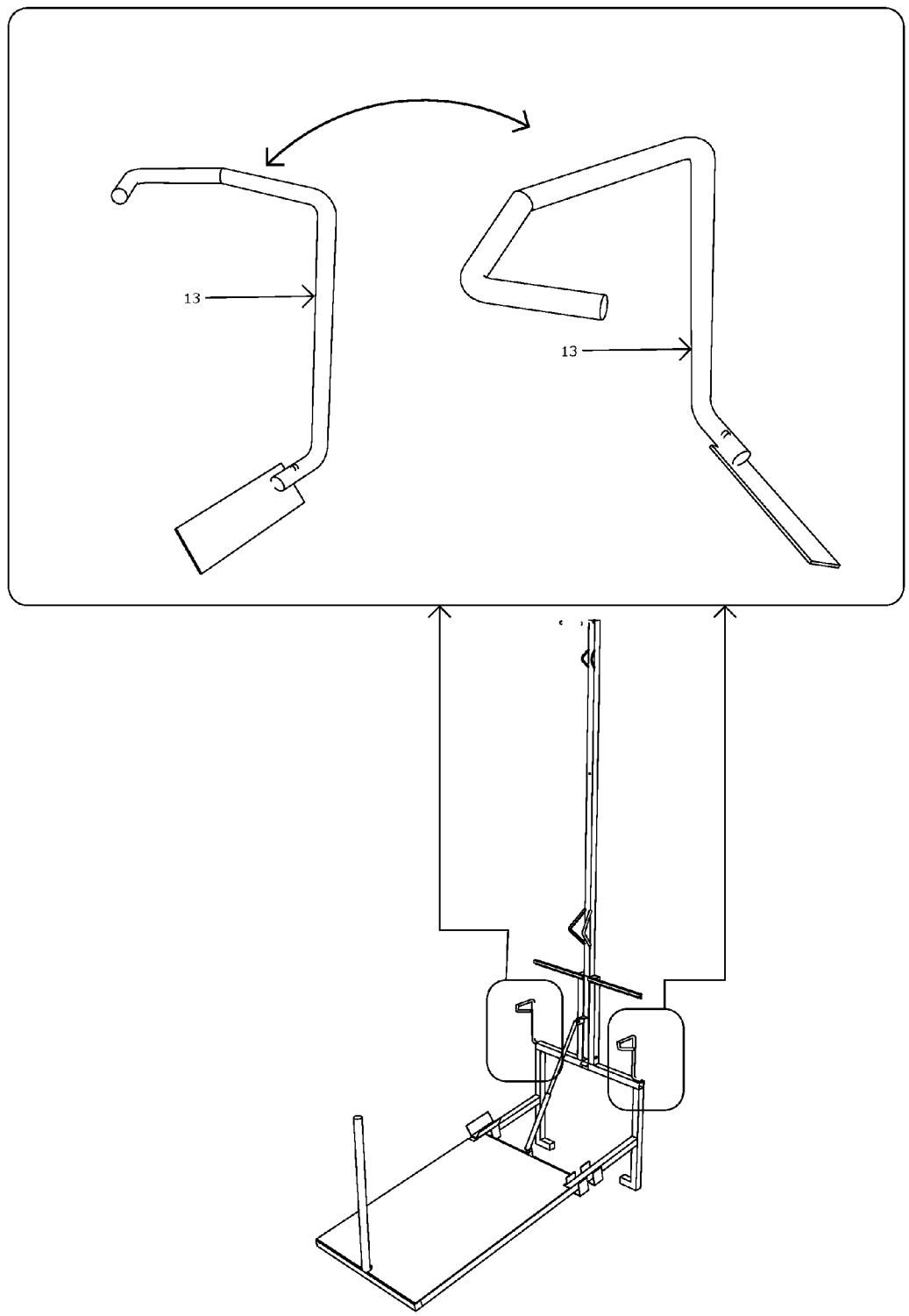
FIG. 14 is a detailed depiction of a non-limiting example of member 13.
Figure 15:
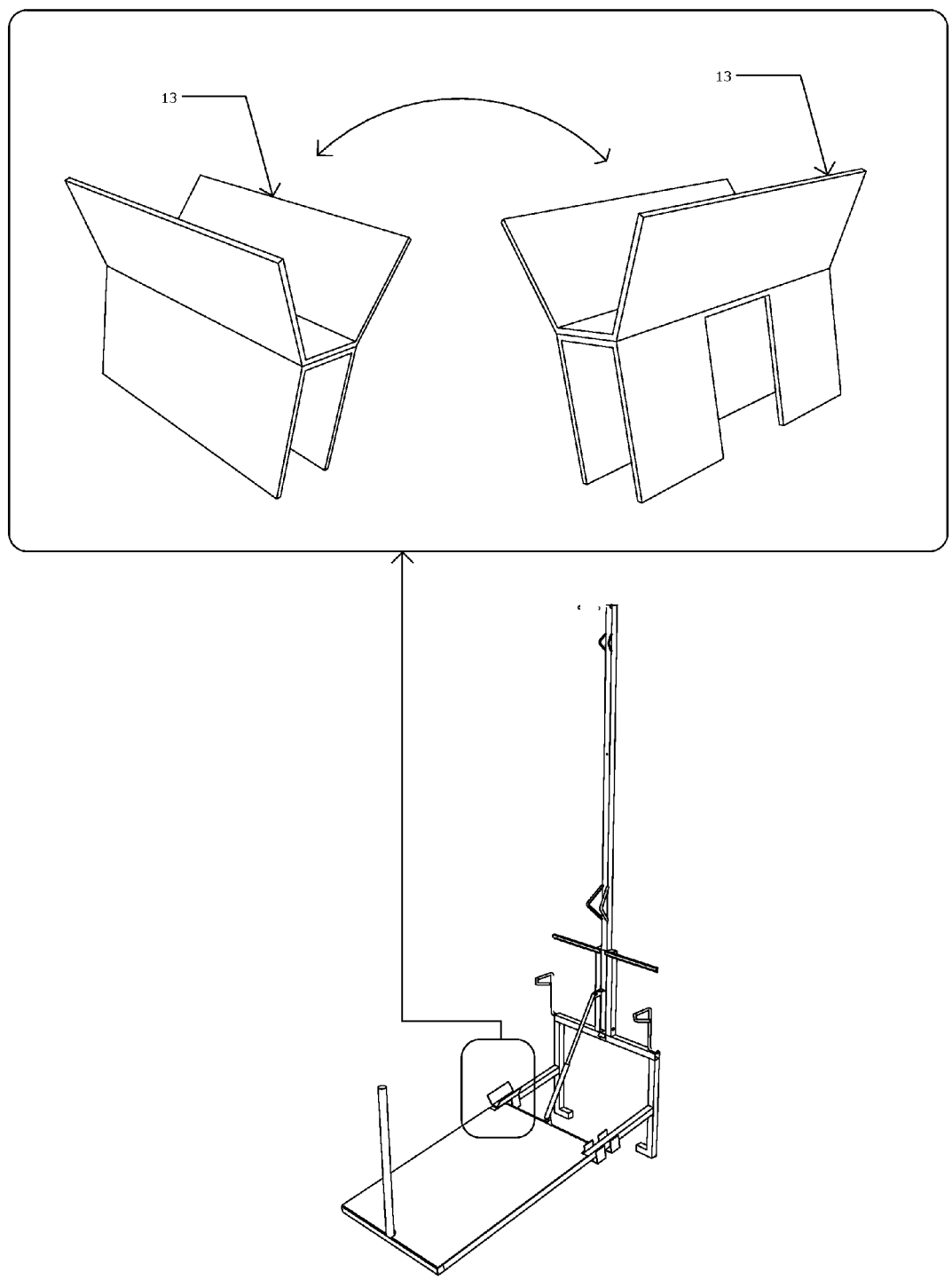
FIG. 15 is a detailed depiction of a non-limiting example of member 34.

Besides the characteristics of the item that is mounted on mounting portion 4, the apparatus can display additional items. One or more items, such as bicycles, may be displayed whilst sitting on panel 18 which is affixed to frame 2. The one or more items may be stabilised by member 13. A detailed and non-limiting example of member 13 is shown in FIG. 14. One end of member 13 is affixed to member 17 of frame 2 whilst the other end is free. The free end is shown in FIG. 14 to comprise a rubber coated member. Any means that affixes member 13 to member 17 is contemplated herein. By mere example, FIG. 14 shows that member 13 is affixed to member 17 via 33 and plate 32.

Figure 9B:
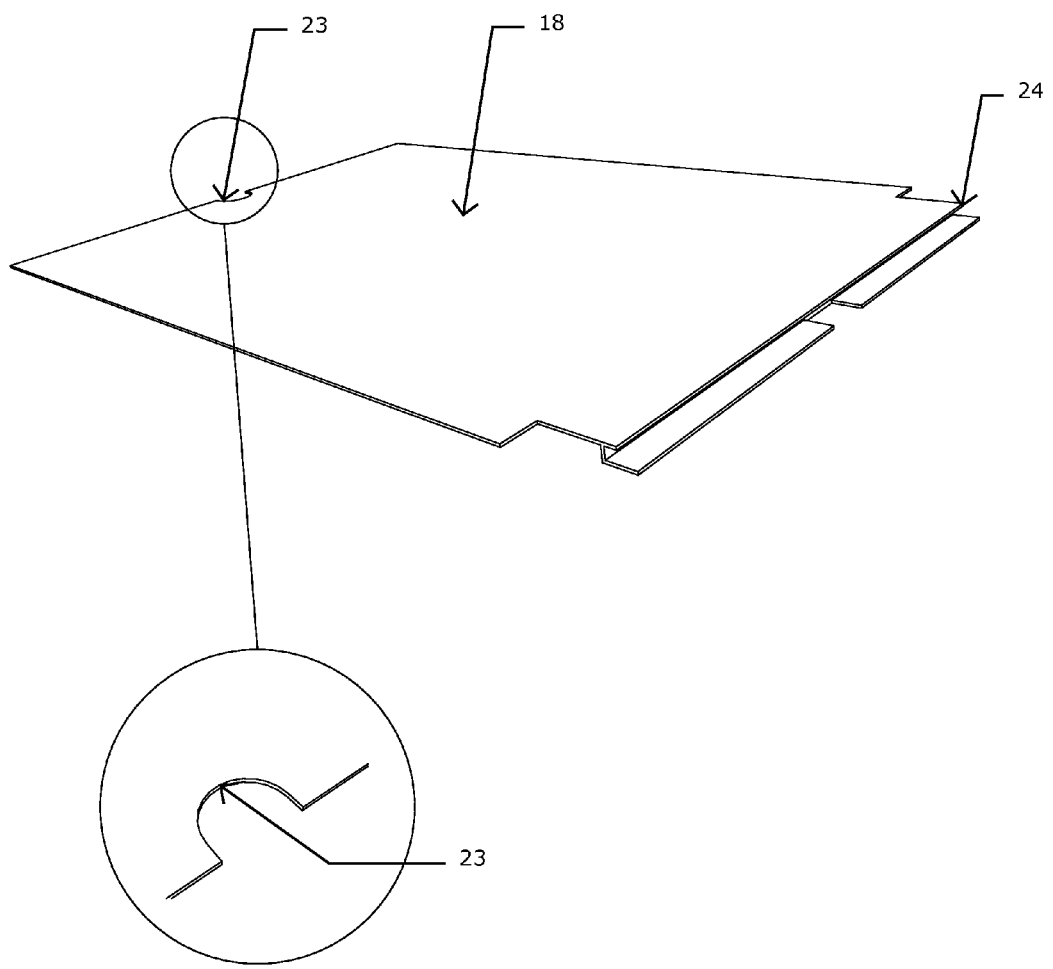
Figure 9C:
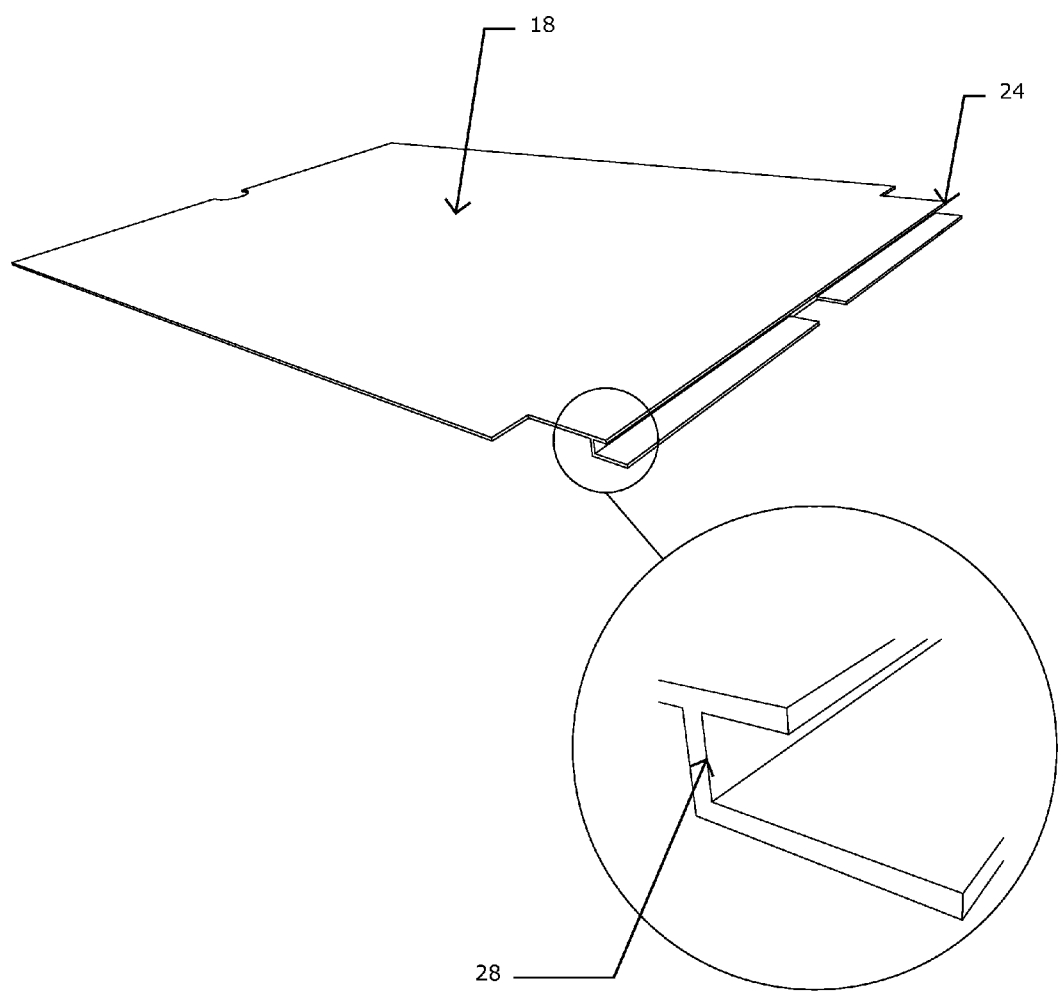
Figure 10:
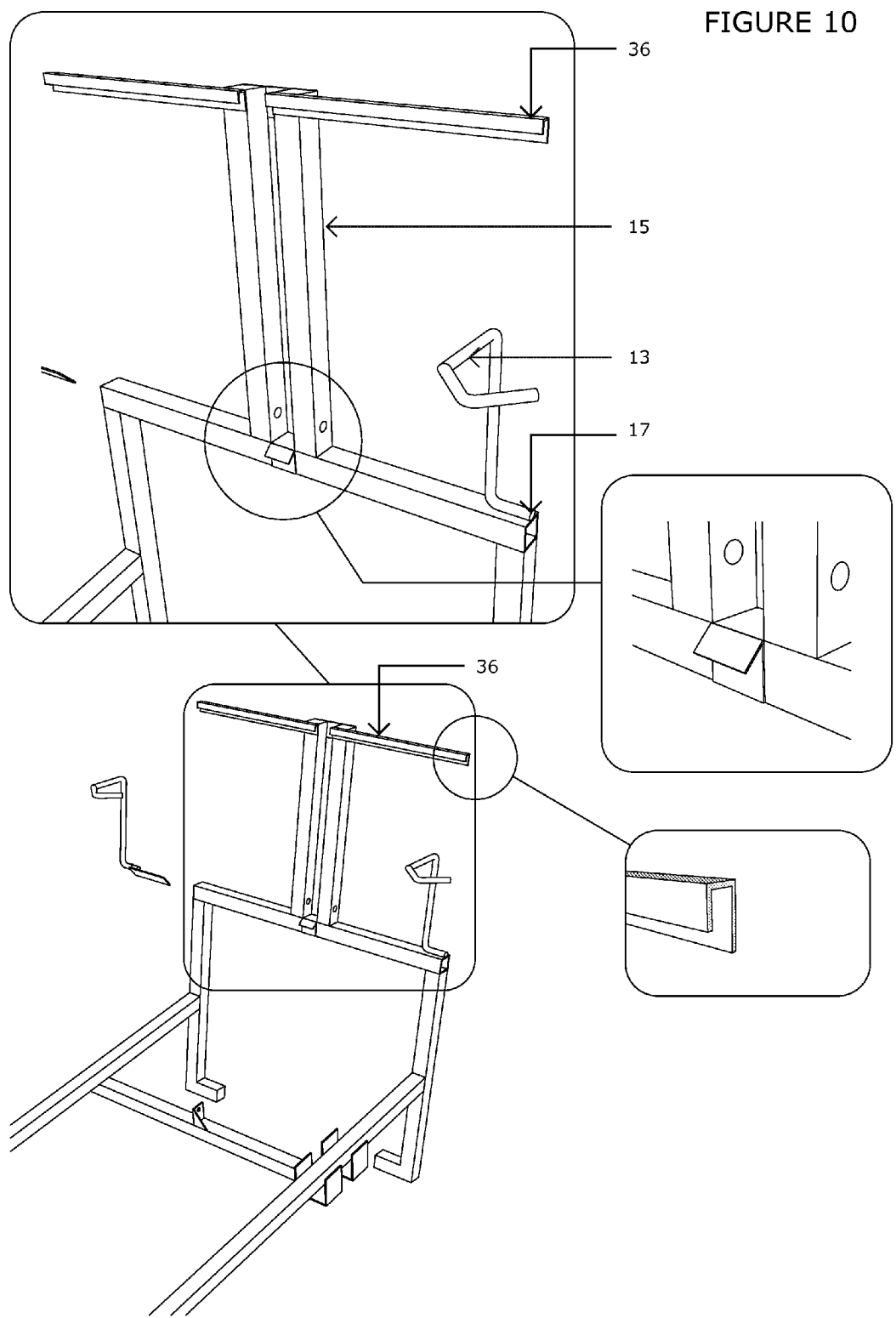
FIG. 10 is a focused view of member 36, members 15, member 17 and members 13.

Panel 18 as represented in FIGS. 9A and 9B, for example, is interchangeable with other panels. Panel 18 is flexible and made from a variety of durable but flexible materials such as a variety of plastics. One of the plastics may be polyvinyl chloride (PVC) but any plastics or alternative material may be used to construct the panel. An example of how panel 18 may be designed is represented in FIG. 9B. In FIG. 9B, panel 18 comprises a lip 24 for connection to member 10 and guide 19. Lip 24 is shown in more detail as represented by 28 in FIG. 9C. Panel 18 also comprises notch 23 which fits around the lower end of member 12.

A sales clerk has the option of displaying one or more items by placing such items onto panel 18 and stabilising the items by member 13, displaying an item by mounting such item onto mounting portion 4 or combination thereof. An example of the dimensions of panel 18 is also provided in FIG. 9B but the dimensions of panel 18 can be any and allow for additional items to be displayed on or near the panel of the apparatus. The additional items may be stabilized by members affixed to members 16 of frame 2. Examples of such members are represented as 29 in FIGS. 12 and 34 in FIG. 15. The members may be in the form of brackets or braces but any design or shape that assists in stabilizing the display items is contemplated herein. Members 29 also function to link two or more apparatus together. The two or more apparatus may be linked together in a series or linear fashion.

The display apparatus is designed to provide a simple, effective and safe manner of maximising storage and merchandising areas by utilising previously unused space. The display can be used for many different items and is not limited to solely bicycles. Other items such as recreational items, lawn care machinery and auto accessories and parts may be mounted on the apparatus. They are contemplated herein. Examples of recreational items displayed by the apparatus of the present invention may include, but not limited to, canoes, kayaks, small boats, jet skis, outboard motors and trolling motors. Examples of gardening and lawn care machinery displayed by the apparatus of the present invention may include, but not limited to, lawn mowers, weed trimmers and blowers. Examples of auto accessories and parts displayed by the apparatus of the present invention may include, but not limited to, hubcaps, rims, tyres, and engine blocks.

Figure 1:
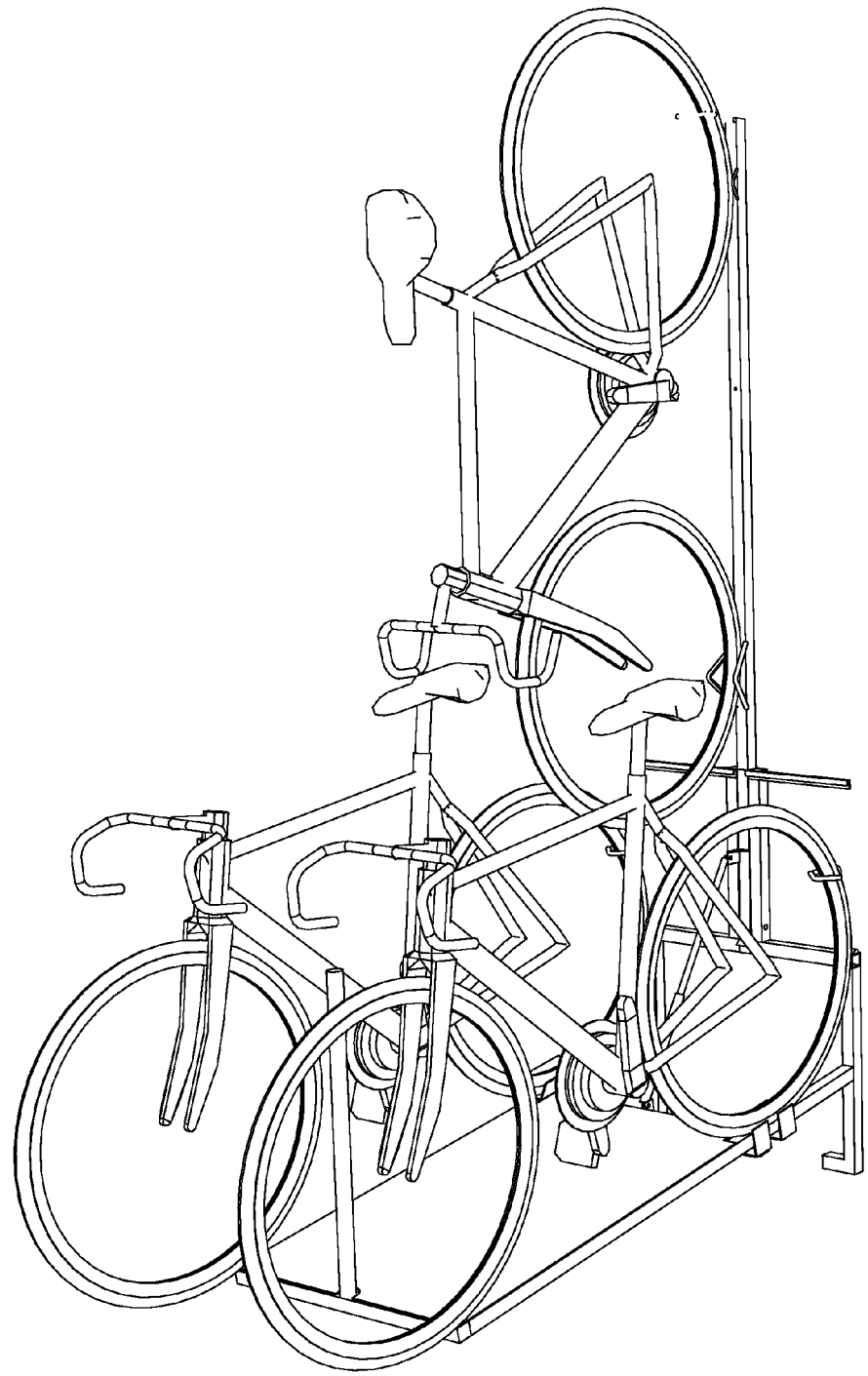
FIG. 1 is a view of an apparatus encompassed by the present invention wherein the display arm 8 is in a fully raised position. As shown, a bicycle is mounted on the display arm.
Figure 3A:
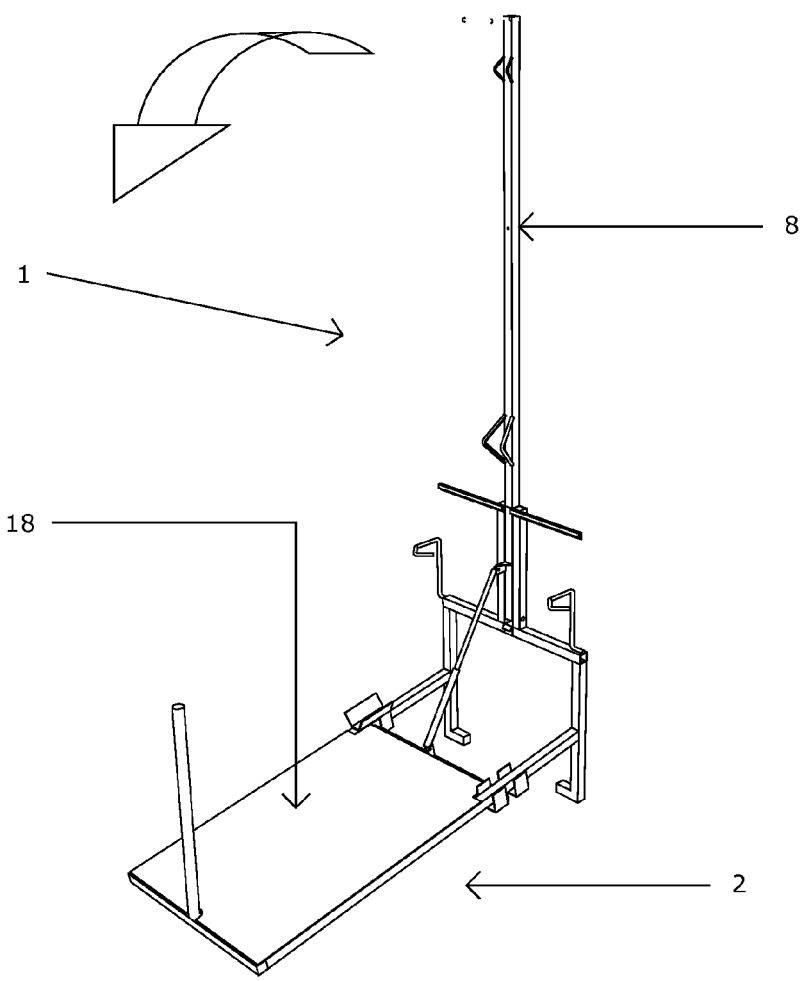
FIG. 3A is a view of an apparatus encompassed by the present invention without any items mounted on arm 8.
Figure 3B:
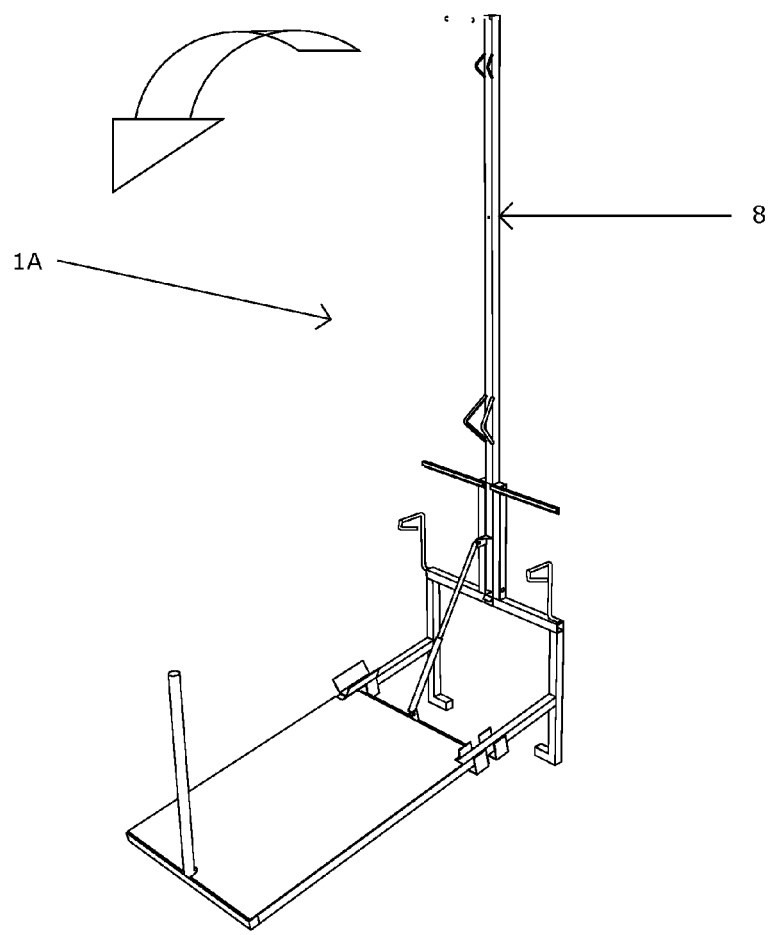
FIG. 3B is a view of an apparatus encompassed by the present invention without any items mounted on arm 8 and without panel 18. The arrows in FIGS. 3A and 3B generally show the trajectory of arm 8 when taken from a fully raised position towards a lower position.
Figure 4:
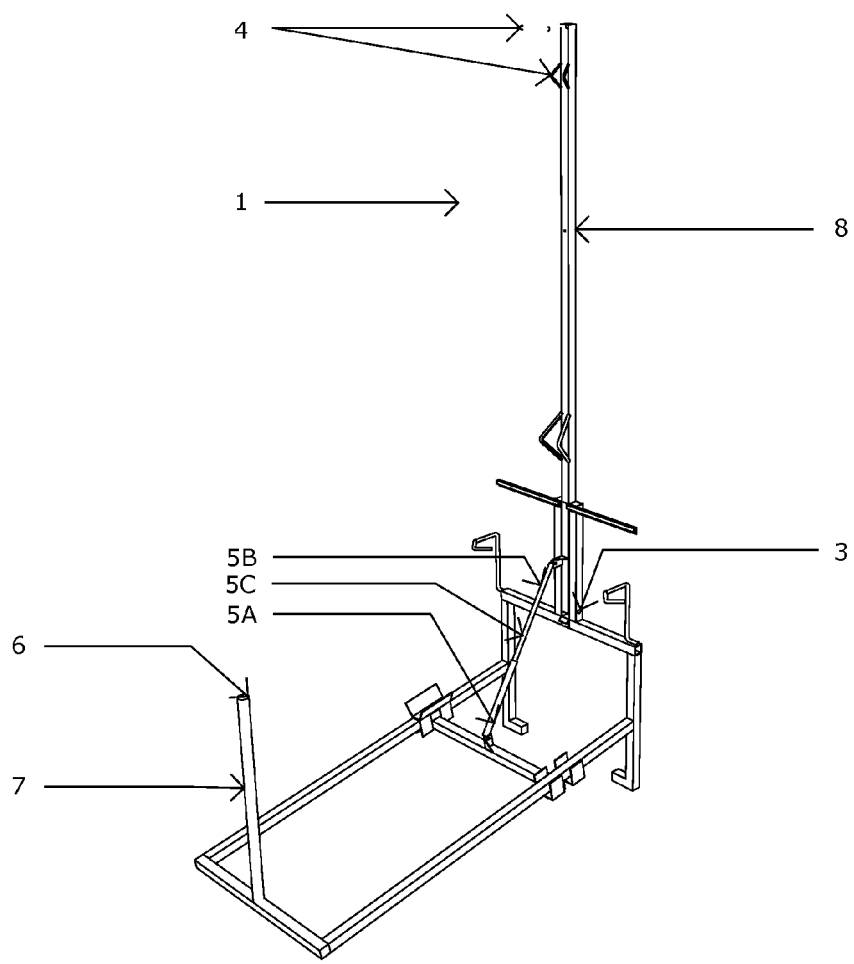
FIG. 4 is a view of an apparatus encompassed by the present invention without any items mounted on arm 8 and without panel 18. Arm 8 is in a fully raised position.
Figure 5:
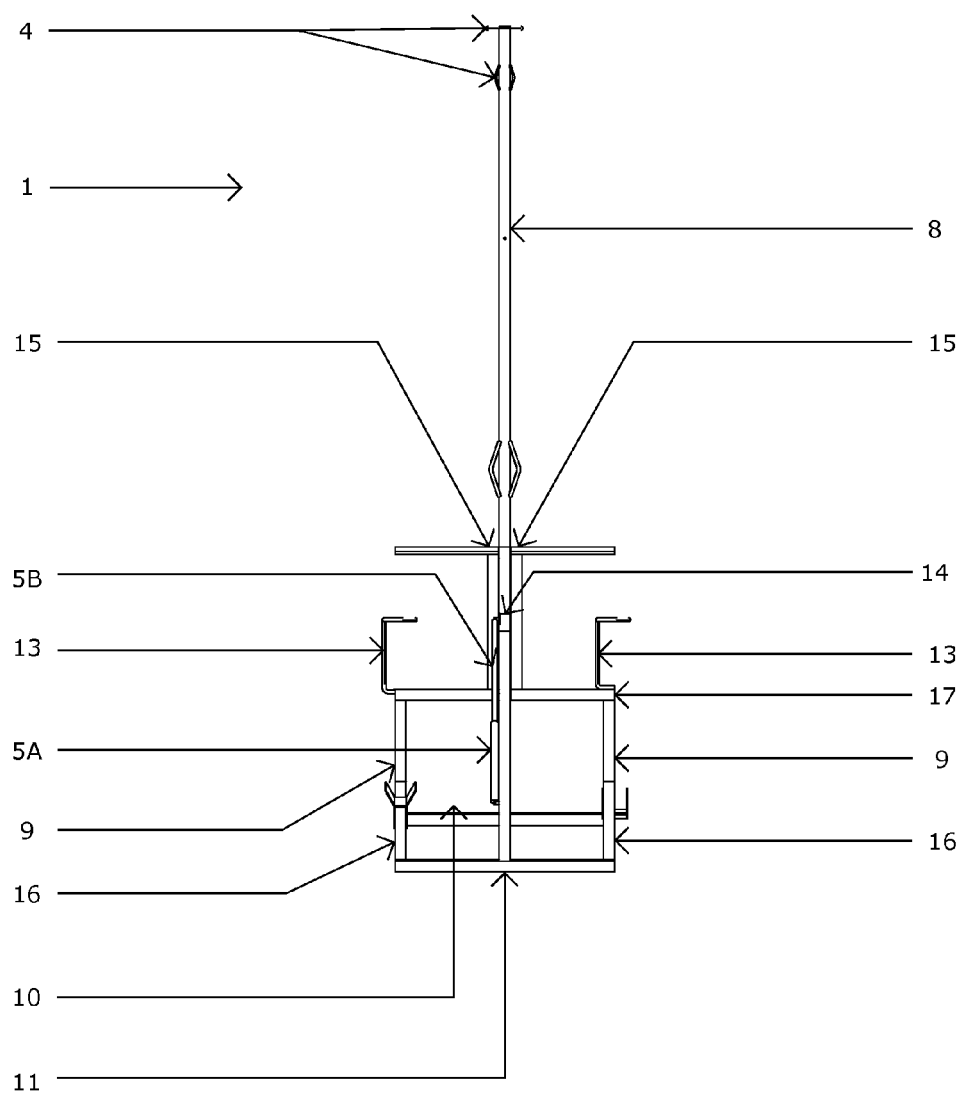
FIG. 5 is a front view of an apparatus encompassed by the present invention without any items mounted on arm 8 and without panel 18. Arm 8 is in a fully raised position.
Figure 6:
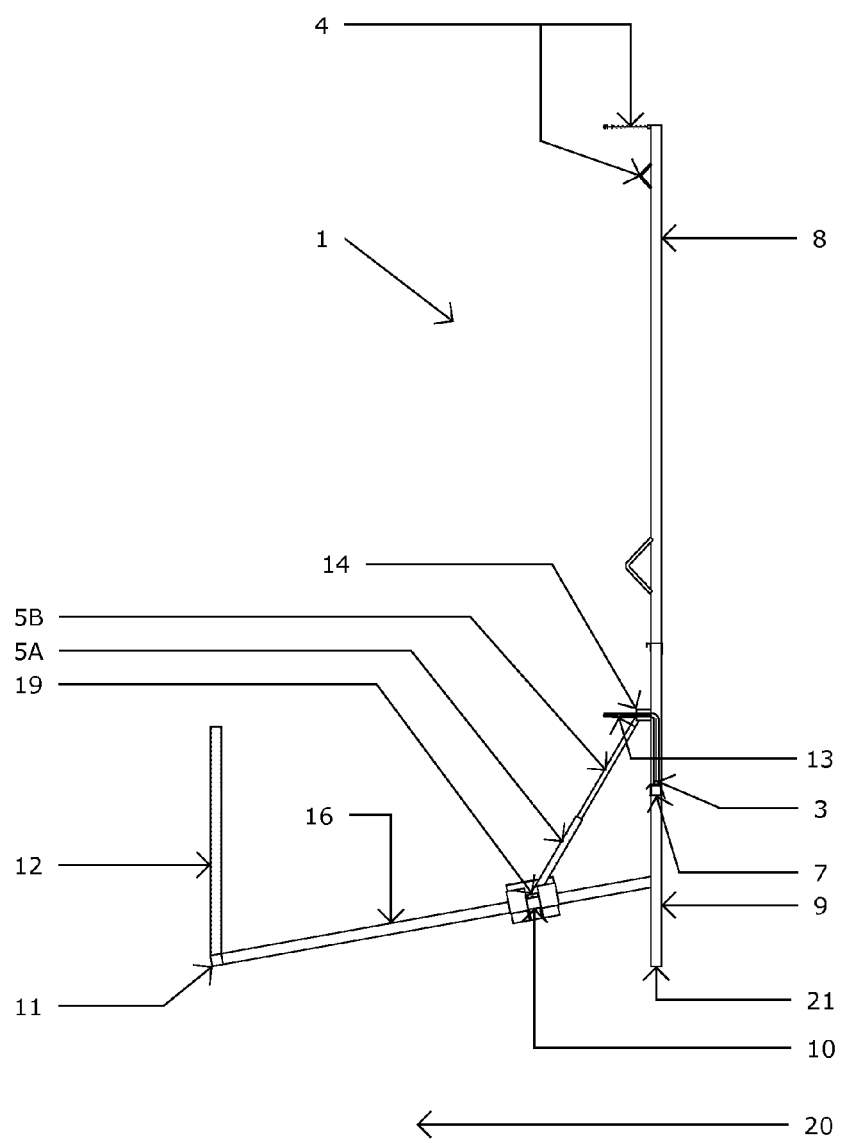
FIG. 6 is a side view of an apparatus encompassed by the present invention without any items mounted on arm 8 and without panel 18. Arm 8 is in a fully raised position. A blown up depiction of member 12 and wheel stand 7 are shown.
Figure 7:
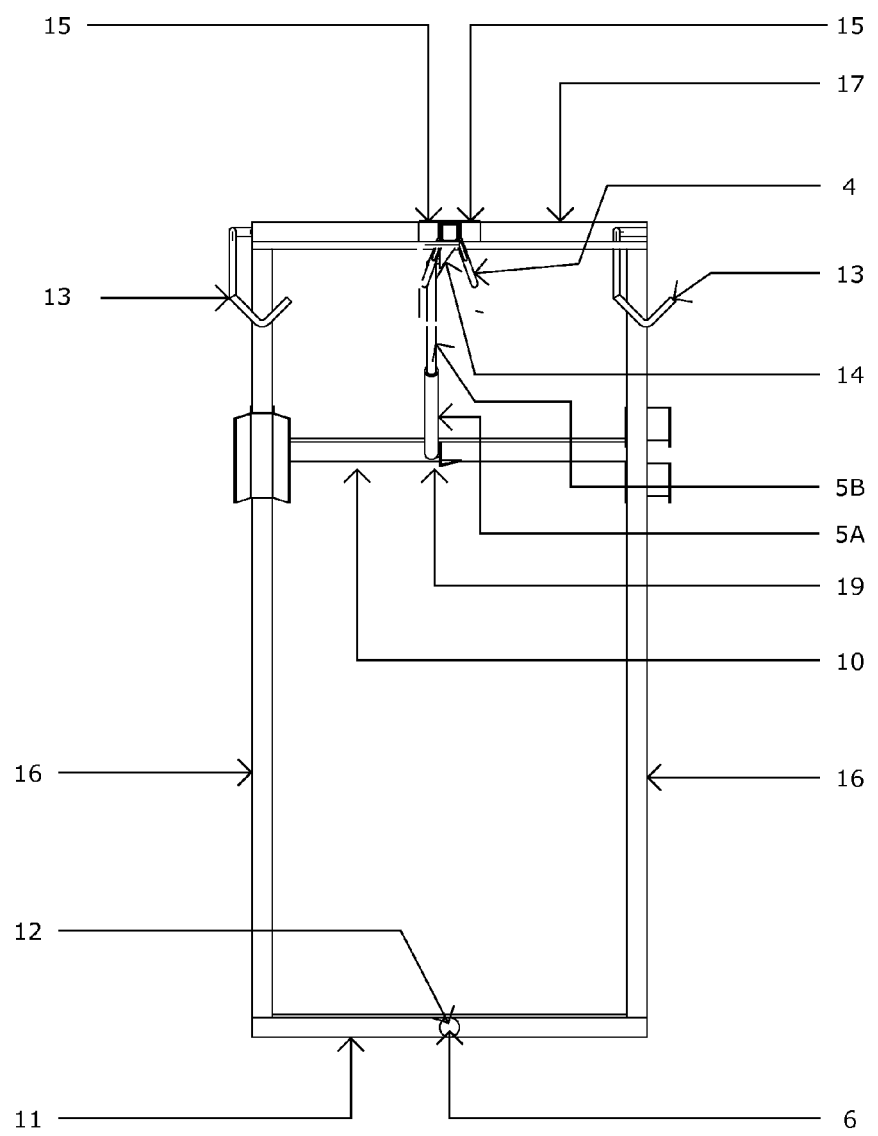
FIG. 7 is a top view of an apparatus encompassed by the present invention without any items mounted arm 8 and without panel 18. Arm 8 is in a fully raised position.

As illustrated in FIG. 1, an item such as a bicycle can be mounted on display arm 8 in a raised position such that the item can be easily seen by a customer. It is likely that the item will be at eye level with a customer of average height. If required, the bicycle can be lowered to a position between a fully raised position and a fully lowered position to ensure that the item is at eye level with customer. The upper left schematic diagram of FIG. 2 shows the apparatus when display arm 8 is in between a fully raised position and a fully lowered position. In any case, once the customer has shown interest in the item, a sales clerk has the ability to lower the item to the floor if desired with minimum force as shown in the lower right schematic diagram of FIG. 2. This will allow the customer to study the item with greater detail and handle the item which may increase the likelihood of a sale. If the item is a bicycle, the customer may wish to lift the bicycle to judge its weight and determine balance between the front and rear of the bicycle, grip the handlebars, test the brakes and feel the texture of the bicycle frame and seat.

While some embodiments of the present invention have been described in the foregoing and in the drawings, it is to be understood that other embodiments are possible within the scope of the invention.

The invention is to be considered limited solely by the scope of the claims which relate to:

A display apparatus comprising a frame and a display arm having a mounting portion at one end for mounting an item for displaying wherein the display arm is pivotally mounted at its other end to the frame for movement between a raised position and a lowered position, wherein the display arm is biased towards the raised position. The invention is to be considered limited solely by the scope of the claims which relate to:

The frame of the apparatus is free-standing.

The mounting portion of the apparatus is selected from the group comprising hook, clip, bracket, clamp, clasp, ring, strap, fastener or any combination thereof.

The hook of the apparatus is a wheel hook.

The item is a bicycle.

The frame of the apparatus comprises a portion for retaining the display arm at a lowered position.

The portion of the frame retains the display arm by magnetic means or mechanical means.

The portion of the frame comprises one or more magnets.

The one or more magnets is affixed on top or near the top of the portion.

The mechanical means comprises use of a hook, clip, bracket, clamp, clasp, ring, fastener, strap or any combination thereof to retain the display arm in a lowering position.

The apparatus comprising means to stabilise the item when the display arm is in a fully lowered positioned.

The means for stabilising an item is a wheel stand.

The raised position is a fully raised position and is a substantially vertical position compared to the floor.

The lowered position is a fully lowered position and is a substantially horizontal position compared to the floor.

The arm is biased towards a raised position by a shaft and piston arrangement.

The shaft and piston arrangement is a gas strut.

The arm pivots at a pivot point.

The apparatus comprises two or more display arms.

The apparatus displays additional items.

The additional items are displayed on a panel.

The item is selected from the group comprising recreational items, gardening and lawn care machinery and auto accessories and parts.

The recreational item is selected from the group comprising canoe, a kayak, a small boat, a jet ski, an outboard motor and a trolling motor.

The gardening and lawn care machinery is selected from the group comprising lawn mowers, weed trimmers and blowers.

The auto accessories and parts are selected from the group comprising hubcaps, rims, tyres, and engine blocks.

A package or kit comprising the apparatus in the form of one or more parts for assembly whereby the package or kit further comprises instructions for assembling the apparatus.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A display apparatus comprising a frame and a display arm, wherein the display arm is pivotally mounted at a first end to the frame for movement between a raised position and a lowered position of display arm, wherein the display arm is biased towards the raised position, and wherein the frame comprises a magnetic means or a mechanical means for a support structure for retaining the display arm at the lowered position;
the display arm having:
a mounting portion at a second end for mounting an item at a first item contact point for displaying; and
a stabilizing member attached to the display arm between the mounting portion and the first end of the display arm, the stabilizing member configured to stabilize the item via contact with the item at a second item contact point when the display arm is at a raised position.

2. The apparatus of claim 1 wherein the frame is free-standing.

3. The apparatus of claim 1 wherein the mounting portion is selected from the group comprising hook, clip, bracket, clamp, clasp, ring, strap, fastener or any combination thereof.

4. The apparatus of claim 3 wherein said hook is a wheel hook.

5. The apparatus of claim 1 wherein:
said item is a bicycle;
the first item contact point comprises the rear wheel of the bicycle; and
the second item contact point comprises the front wheel of the bicycle.

6. The apparatus of claim 1 wherein said magnetic means comprises one or more magnets.

7. The apparatus of claim 6 wherein the one or more magnets is affixed on top or near the top of the portion.

8. The apparatus of claim 1 wherein said mechanical means comprises use of a hook, clip, bracket, clamp, clasp, ring, fastener, strap or any combination thereof to retain the display arm in the lowered position.

9. The apparatus of claim 1 comprising means to stabilise the item when the display arm is in the lowered position.

10. The apparatus of claim 9 wherein said means for stabilising an item comprises a wheel stand.

11. The apparatus of claim 1 wherein said raised position of the display arm is a fully raised position and is a substantially vertical position compared to a floor.

12. The apparatus any claim 1 wherein said lowered position of the display arm is a fully lowered position and is a substantially horizontal position compared to a floor.

13. The apparatus of claim 1 wherein said display arm is biased towards the raised position by a shaft and piston arrangement.

14. The apparatus of claim 13 wherein the shaft and piston arrangement is a gas strut.

15. The apparatus of claim 1 wherein said display arm pivots at a pivot point.

16. The apparatus of claim 1 wherein said apparatus comprises two or more display arms.

17. The apparatus of claim 1 wherein said apparatus displays additional items.

18. A package or kit comprising the apparatus of claim 1 in the form of one or more parts for assembly wherein the package or kit further comprises instructions for assembling said apparatus.

19. The apparatus of claim 1, wherein, mounting portion and stabilizing member are on the underside of the display arm when the display arm is in the lowered position.

* * * * *